Feb. 20, 1968 C. AVGERINOS ETAL 3,369,643

ENCODING KEYBOARD

Filed March 24, 1966 8 Sheets-Sheet 1

INVENTORS.
COSTAS AVGERINOS
HENRY R. COFEK

BY C. Harmon Hulbard

ATTORNEY

Feb. 20, 1968 C. AVGERINOS ETAL 3,369,643

ENCODING KEYBOARD

Filed March 24, 1966 8 Sheets-Sheet 3

ENCODING KEYBOARD

ENCODING KEYBOARD

BY 3,369,643

ENCODING KEYBOARD

Costas Avgerinos, 25 Spruce Drive, Wilton, Conn. 06897, and Henry R. Cofek, Fairfield, Conn.; said Cofek assignor to said Avgerinos Filed Mar. 24, 1966, Ser. No. 537,183
15 Claims. (Cl. 197—98)

ABSTRACT OF THE DISCLOSURE

A keyboard mechanism having a design that is universally applicable for use in conjunction with a wide variety of office machines, or the like. The mechanism is manually actuable for generating signals representative of input data, and includes a plurality of encoding members which are positively driven by an oscillating drive member. The touch of the keyboard is readily adjusted by a uniformly acting interlock arrangement.

This application relates generally to a keyboard mechanism manually actuable for generating signals representative of input data for entry into data processing systems, the invention relating more particularly to power-assisted keyboard mechanisms adapted to encode key selected data into a combination of signals for parallel entry into the input means of the respective data processing system.

The keyboard as herein shown and described may be considered to be of a universal design in that it is applicable for use in conjunction with a wide variety of data encoding means and is readily adaptable to accommodate a wide variety of parallel data processing system codes employing any desired number of code channels. The keyboard may also be readily adapted for operating to deliver input signals either in a synchronous, or in an asynchronous manner.

The mechanism is shown herein in an embodiment wherein the encoding function is accomplished through photoelectric means employing circuitry advantageously making use of the reliability characteristics and low power requirements of solid-state components. Another embodiment of encoding means herein disclosed makes advantageous use of printed circuitry in conjunction with a unique contact-making concept to derive the benefits of the low-cost possibilities inherent in printed circuit techniques but without the customary contact wear factor usually associated with printed circuit applications. In each embodiment of the encoding means herein disclosed standardization of the respective parts associated with each operating key of the keyboard has been achieved to a large extent thus contributing greatly to the low cost of production of the mechanism.

The keyboard of the instant invention has been designed to provide each operating key with the same identical key stroke which may be of extremely short distance while yet providing foolproof operation of the mechanism responding thereto. Furthermore, each key is provided with exactly the same feel or touch which may be very light in comparison with conventional keyboards designed for the same purpose but without affecting reliability in the keyboard operation. Furthermore, the touch of the keyboard may be readily adjusted by a unique key-interlock mechanism which acts uniformly on all the operating keys. The interlock mechanism is of such a nature as to present a minimum amount of resistance to key action, thus contributing to the light touch possible with the apparatus and consequent lessening of fatigue on the operator and is so designed as to serve as the key restoring means, thus eliminating the need for providing separate key restoring mechanism for each of the operating keys.

The mechanism is designed so that the operating keys serve to trigger a respective encoding mechanism which is power driven in a unique manner to achieve positive actuation of the respective encoding member in high-speed operation but without a resultant mechanical shock characteristic of conventional positive drive mechanisms, thus providing the device with a smooth and vibration-reduced operation contributing to less strain on the parts and generally longer life of the mechanism. The power drive member is in the form of an oscillating or reciprocally driven plate formed into what may be referred to as a power drive grid which has a cam-controlled cyclic movement so designed as to actuate a respective encoding member at varying predetermined rates of acceleration and deceleration to make possible a mode of operation not possible in the more conventional positive-drive mechanisms which customarily are in the form of a snatch roll driven at a constant r.p.m.

It is, therefore, an object of this invention to improve upon keyboard mechanisms for generating manually selectable signals representing encoded data for entry into data processing systems.

It is the further object of this invention to improve upon the means for actuating an encoding member under keyboard control.

It is the still further object of this invention to provide an improved keyboard apparatus which is readily adaptable for encoding data into a variety of parallel code signals.

It is still the further object of this invention to improve the response of keyboards capable of triggering associated encoding means.

It is still another object of the invention to improve upon the means for interlocking the keys of a keyboard to prevent actuation of more than one key in any one operating cycle of the mechanism.

It is a still further object of the invention to improve upon the means for adjusting the touch of a keyboard mechanism.

Other objects of the invention together with the features contributing thereto and advantages accruing therefrom will be apparent from the following description when read in conjunction with the drawing wherein.

Figure 11:
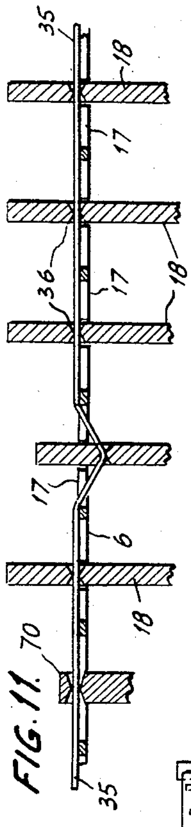
FIG. 11 is a fragmentary view in section illustrating the operation of the interlock means.

Referring now to the drawing and to FIGS. 1–4 in particular, the basic framework of the machine includes an upper section 5 for supporting the keyboard means of the apparatus, it being understood that the mechanism is shown with the top keyboard cover removed, the upper section comprising a top plate 6 extending across the full width of the machine and bent downward at each side to provide upright sidewalls 7 for the upper section of the apparatus. Suspended from the top plate 6 is a U-shaped frame having a bottom wall 8, the ends of which are bent upwardly to form sidewalls 9 which at their upper extremities are bent outwardly to form a flange by which the depending frame is suitably attached to the underside of the topwall 6. The upper section 5 is firmly secured to a lower section 10 comprised of a substantially U-shaped frame having a bottom wall 11 bent upwardly to form sidewalls 12, the upper extremities of which are bent outwardly as are the lower extremities of the sidewalls 7 to form flanges whereby the upper and lower sections are secured rigidly by bolts or the like to each other and to horizontally disposed plates 13, 14 which are formed to provide a support for a power drive member, hereinafter to be described, and which in effect separate the upper section 5 from the lower section 10 of the machine.

The frame plates 6, 8 of the upper section are formed with vertically aligned openings, the openings in the lower plate 8 being in the form of a rectangular slot and those in the top plate 6 being in the form of a cross 17 formed by the two perpendicularly intersecting slots of different widths, each pair of aligned slots 16 and 17 serving to guide for vertical movement an associated key comprised of a key stem 18 of rectangular cross section, each said key stem being closely fitted into a rectangular slot 16 of the lower guide or support plate 8 and into the narrower one of the aligned intersecting slots 17 formed in the top plate 6. The locations of the slots are such as to support the key stems in horizontally extending rows in a conventional keyboard layout, there being in the present instance four rows or banks of key stems, those of each row being laterally offset slightly from those of the other in the usual manner. Fitted to the top of each key stem 18 is a key top 21 which is preferably cylindrical in cross section and also preferably detachably removable from its associated key stem, the upper surface of the key top being labeled to designate the item of data represented thereby. The key stems 18 may be made of any suitable material but preferably are molded of a relatively rigid plastic having a low friction co-efficient so as to enable the key stems to slide freely and without need of lubrication in their respective guide plates 6, 8. The lower extremity of each stem is formed with an enlarged foot 22, best seen in FIG. 5, which serves as a limit to the upward movement of the key stem. The key tops 21 for the respective rows of banks of keys are made of graduated height in order that the striking surface of the keys of the respective banks from front to rear of the machine may be slightly elevated relative to one another to better conform to the natural position of the hand of the user as is customary in keyboard design. In the case of the "Tape feed-Space bar" key, the construction is slightly modified from that of the data keys and is represented by an elongated key top 23 fitted to two spaced-apart key stems 24 which are slightly modified over the construction of the key stems 18 for reasons which will be hereinafter more fully described.

Each of the key stems 18 is formed with a cut-away portion communicating with its bottom edge and in the general shape of a key way 25 in which is fitted for pivotal movement to a limited extent a key stem extension 26 which is of substantially the same thickness as the associated key stem 18, it being formed with a substantially circular head 27 and a downwardly extending leg 28 on the forward edge of which is formed an inclined camming shoulder 29. The head 27 of the extension is seated in the circular portion of the key way slot 25 to provide a pivotal bearing between the extension and the key stem 18, the parts being held in pivotal engagement under the influence of a spring clip 31 formed at its upper extremity with ears 32 frictionally engaging the key stem 18 and at its bottom extremity with ears 33 frictionally engaging the leg 26 of the key stem extension. The clip 31 has a shape conforming to the substantially circular head and leg portion of the key stem extension and provides means for biasing the leg into a substantially vertical position relative to the key stem wherein it limits against the forward edge of the slot 25 and enabling the extension to pivot rearwardly about its head portion and within the confines of the tapered bottom portion of the slot 25.

From the foregoing, it will be noted that each of the key stems 18 for the operating data keys of the keyboard are of identical construction and are adapted to slide vertically within their respective guides to the same extent, the structures varying from one another only with respect to the height of the respective key tops 21 for the purpose of providing graduated levels for the respective banks of the keys. Operation of any one of the data keys results in actuation of an associated encoding member in a manner to be hereinafter more fully described, the restoring movement of the key stem being accomplished through a novel key interlock means which, in addition to limiting the extent to which a key stem may be depressed, also effectively prevents more than one key from being operated in any one cycle of operation, thereby avoiding erroneous entry of input data. The interlocking means comprises a member which is common to each one of the data keys to result in providing each key with exactly the same amount of resistance to manual depression, thus providing each key with exactly the same touch or feel as every other key, the resistant force of which may be readily adjusted as desired.

The keyboard interlock and restoring means includes a flexible band or cord 35 made of any suitable inelastic material, the ends of which are coupled together by a device under selectively adjustable spring tension to constitute in effect an endless loop which is threaded through suitably formed eyelets 36 provided in each of the key stems 18. The cord 35 is supported on the top surface of the top guide plate 6 and is strung through the key stems of each bank in series, the cord running from the end coupling device 40, as can best be seen in FIG. 1, around a pulley 37 rotatably secured to the bent-over extension of the top section frame wall 9 and thence running through all the key stems of the uppermost rear bank and around a pulley 38 similarly rotatably secured on the opposite side of the keyboard, thence running through all of the key stems of the next row of keys and about another pulley 39 from whence it is threaded through all the key stems of the next lower bank of keys to extend around a pulley 41, thence extending through all the key stems of the front or lowermost bank of keys to a pulley 42 and back to where it is coupled with its opposite end in the coupling device 40. The coupling device, as can best be seen in FIG. 10, constitutes an assembly comprising a tubular housing 45 receiving at one end thereof a tubular plunger 46, the outer end of which is slotted and exteriorly threaded to carry a locking nut 47 for clamping one end of the cord which is threaded through the slot in the plunger 46. The inner end of the plunger 46 is fitted with a collar 48 adapted to limit against a shoulder formed in the interior bore of the fitting 45 under the tension of a compression spring 51, the spring being seated at one end against the inner end of the plunger and at the other end against a shoulder formed in the interior bore of an opposed tubular fitting 52 threaded into its respective end of the housing 45 and having its exterior end, similar to the plunger 46, exteriorly threaded and slotted to receive the opposite end of cord 35 which is clamped thereto by an associated nut 53. A recess 54 formed in the fitting 52 is provided to serve as a convenient means for inserting an appropriately shaped tool for rotating the fitting relative to the housing 45 to appropriately adjust the gap between members 46, 52 and the compressed condition of the spring 51 thereby varying the tension imparted to the cord 35, the amount of tension on the cord 35 in turn determining the resistance the cord offers to depression of any one of the data keys of the keyboard. As heretofore mentioned, the apparatus is designed so as to be usable in a synchronous or in an asynchronous manner through a drive means associated with the encoding mechanism which may be, in the former case, constantly oscillating without regard to the exact time of key depression, or, in the latter case, which may be activated only upon depression of a key by means of a circuit for the drive mechanism completed in response to key actuation and in which case an appropriate one-revolution clutch means of any suitable type would be employed. For the asynchronous mode of operation, the coupling device 40 may be provided with a convenient means for completing the circuit for energizing the drive mechanism, said means including a magnetic switch 55 normally contained in an envelope of glass or other nonmagnetic material and housing a pair of opposed reeds of magnetizable material which are normally open at a predetermined gap distance and which are caused to close under the influence of magnetic flux embracing their overlapped portions. For such applications, a ring 56 fitted to the plunger 46 of the coupling device above the collar 48 may be formed of a permanently magnetized material so that for each key operation as the cord 35 is tautened to compress the spring 51 the ring 56 will be brought into actuating relation to the switch 55, thereby closing a circuit for initiating a machine cycle of operation as a result of the control circuit thus completed.

FIG. 11 illustrates the action of the interlocking cord 35 during key operation wherein it will be noted that the depression of a key stem 18, the second from the left in FIG. 11, acts to depress and form a bend in a section of the cord extending over the associated opening of the key guide plate 6, the openings being sufficiently extended in the direction of the cord axis to allow free movement of the cord into its flexed position, the stress on the cord resulting from key actuation causing inward movement of the plunger 46 (FIG. 10) against the resistance of the spring 51. The extent of travel of the key stem upon actuation is limited by the spacing between the plunger 46 and the fitting 52 of the coupling assembly which, although it may be adjusted within certain limits for varying key stroke length and resistance, is nevertheless always maintained at a spacing which will provide insufficient flexing of the cord as would be required if two keys were depressed simultaneously. The relationship between the permitted travel of a key stem and the extent of travel required to initiate an operating cycle is such that the key must be depressed approximately eighty percent of its maximum extent of movement before a cycle will be initiated. Accordingly, simultaneous depression of two keys will permit them to travel only approximately fifty percent of their full maximum stroke thereby preventing the initiation of an operating cycle under control of two keys. In such instances, the key which is depressed with the greater force will eventually reach its cycle-initiating position but in so doing will automatically tend to return the other key to its upper restored position. This operation has the advantageous result of indicating to the operator, whenever an inadvertent depression simultaneously of two keys occurs, that one of the two keys will not have entered data into the mechanism, this being the key which was forcibly returned to its inactive or restored position. It should also be noted that by providing a coupling device 40 for securing the two ends of the interlock cord 35 which is in no way secured in fixed relation to the frame of the machine, so as to in effect render the interlock cord an endless loop possessing the same degree of tautness at every section thereof, gives assurance that the resistance to key actuation will be uniform for any key regardless of its location on the keyboard as opposed to an arrangement in which, for example, the ends of the cord are secured to a portion of the machine frame. In the latter case, a key stem of the entire series relatively close to a secured end of the cord would be met with a different resistance to key actuation than would a key stem located remotely from the secured end of the cord due to the difference in frictional drag resulting from the respective locations of the key stems in the entire series and the inability of the cord to adjustably self compensate for variations in fractional drag resulting from different respective key stem locations such as is afforded by the freely suspended or floating coupling device of the instant mechanism as above described.

Figures 12, 13, 14, 15:
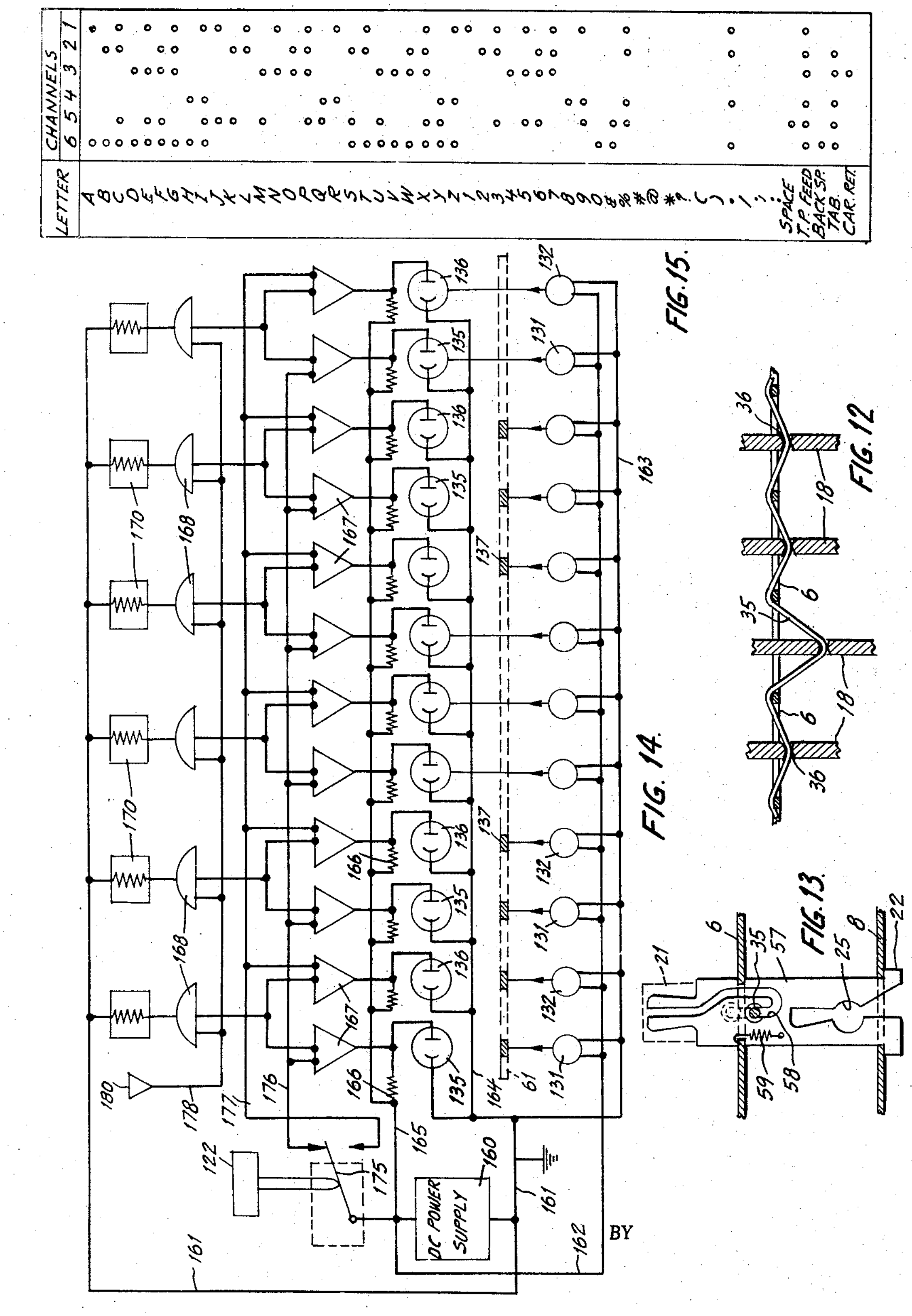
FIG. 12 is a fragmentary view in section illustrating the operation of a modified interlock means.
FIG. 13 is a detail view in section of a key stem which may be utilized with the modified interlock means.
FIG. 14 is a circuit diagram of an encoding circuit according to a first embodiment and employing the encoding members of the foregoing above described views of the drawing.
FIG. 15 is a code chart of a code representative of those which may be utilized by the instant invention.

FIGS. 12 and 13 illustrate a slightly modified arrangement of the interlock means which gives a greater margin of safety in the interlock function. It is of particular advantage for machines operating synchronously since its greater margin of safety enables error-free entry of data at faster operator's speeds and higher machine cycle speeds. As shown in FIGS. 12 and 13, the modified key stems 57 are formed so as to cause the interlock cord 35 to bend downwardly at an angle from the plane of plate 6 in passing through each key stem when in the normal restored or inactivated position as shown in FIG. 12, except for the second key from the left, which is shown fully depressed. Under non-operative conditions cord 35 is disposed in a substantially sinuous configuration having a plurality of similar V-shaped sectors. Due to the angular bend in the cord where it is threaded through each key stem 57, the inadvertent depression of two keys simultaneously will result in the two keys being restrained or blocked after moving a lesser distance than is the case with the former arrangement of FIG. 11. Stated in another way, in the modified arrangement of FIGS. 12, 13, a key depressed to its effective actuating position will restrain the next key to be depressed at a point less advanced or closer to its fully restored position than otherwise would be the case. This result follows from application of the law of secants to the geometric angular disposition of the interlock cord in the modified arrangement.

This modified arrangement could utilize the coupling device 40 of the former arrangement or, if desired, could advantageously be employed in a system wherein the cord performs only the interlock and not the key restoring function in which case the cord 35 could be an endless inelastic member provided with just enough slack to permit full depression of only one key. FIG. 13 shows a key stem construction adaptable for use with such an endless cord, the upper extremity of the key stem 57, over which the removable key top 21 is fitted, being bifurcated to define the outer end of cord receiving slot 58, the inner end of which slot proceeds about an 180° curve to present a substantial J-shape and terminates in a bearing surface for the cord 35 at a location which is below the plane of plate 6 and which places an angular bend in the cord, as aforesaid. When using such an endless interlock cord, each key would be provided with its own restoring spring 59 interconnecting the key stem and the plate 6 in any suitable manner.

In certain applications it may be desired to provide additional interlock means for the keyboard under control of the data processing system with which the keyboard is used to block the operation of the keyboard while the system is processing the data received in one cycle of operation and until it is ready to receive data in the next cycle of operation. For such applications, the keyboard may include a lockout mechanism incorporated with the interlock means just described and taking the form of a magnetic actuator of which the energizing coil 50 and the armature 60 are suitably mounted beneath the keyboard frame plate 6, see FIGS. 1, 11, the armature being pivotally mounted for vertical movement and spring biased to its normal uppermost position. The end of the armature 60 is formed with an upright extension 70 having an opening therethrough, such as in each key stem 18, through which is threaded the interlock cord 35, the upper plate 6 being provided with an opening 17 for receiving the extension 70 of the armature. Energization of the coil 50 under control of the data processing system associated with the keyboard will rock the armature to flex the interlock cord 35 downwardly, in a manner similar to that caused by depression of any one of the data keys, so as to prevent keyboard operation and effectively lock up the keyboard as long as the coil 50 remains energized, thereby indicating that the associated data processing system is not ready to receive input signals from the next operating cycle. By provision of such a keyboard lockout means, assurance can be had that the keyboard will not be operative before the associated data processing system is conditioned to receive input signals generated by operation of the keyboard.

Figures 5, 6:
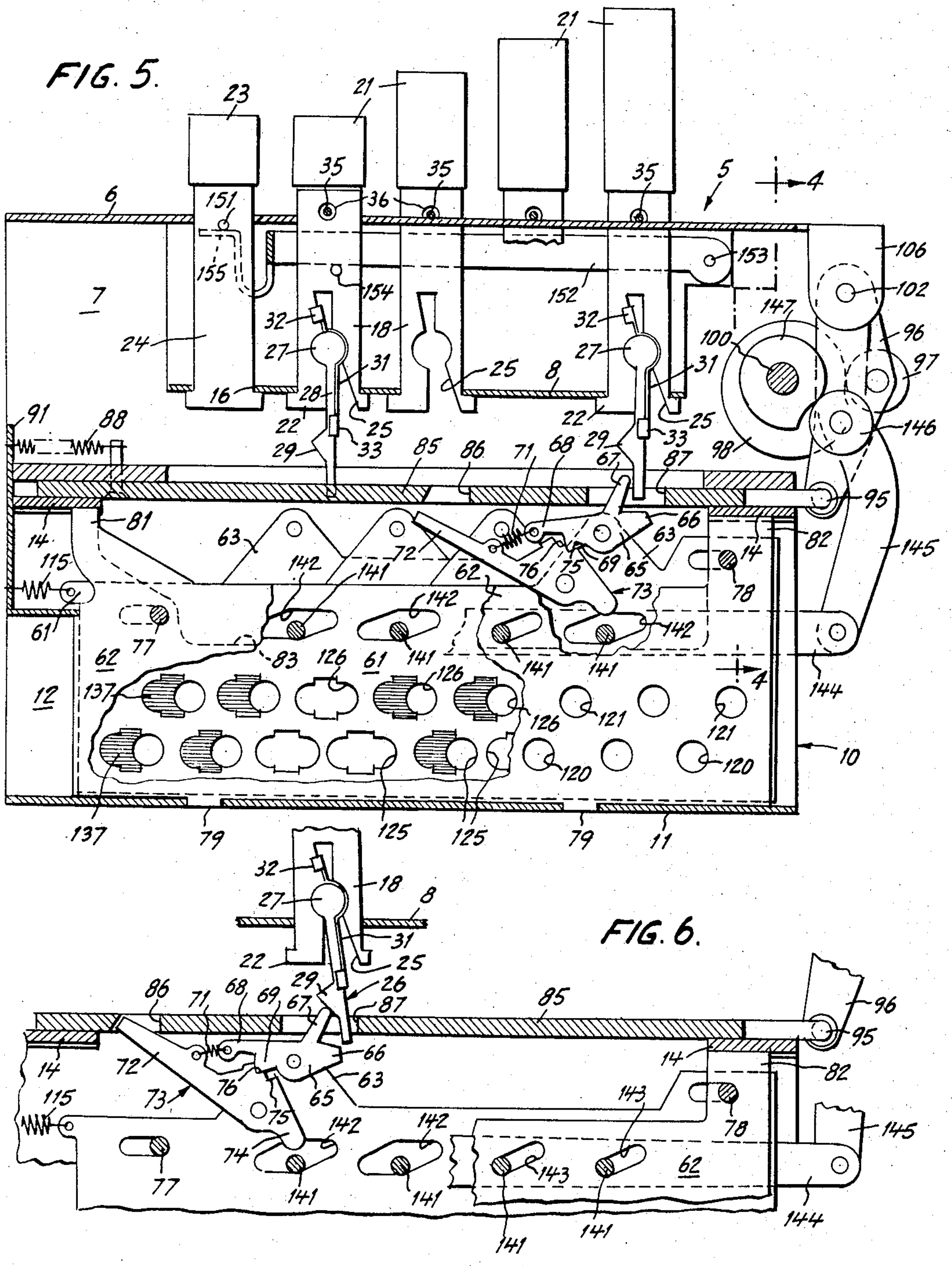
FIG. 5 is a sectional view taken along the line 5—5 of FIG. 1.
FIG. 6 is a sectional view similar to that of FIG. 5 but showing another encoding slide with its triggering mechanism in a different operative position.
Figures 8, 9, 10:
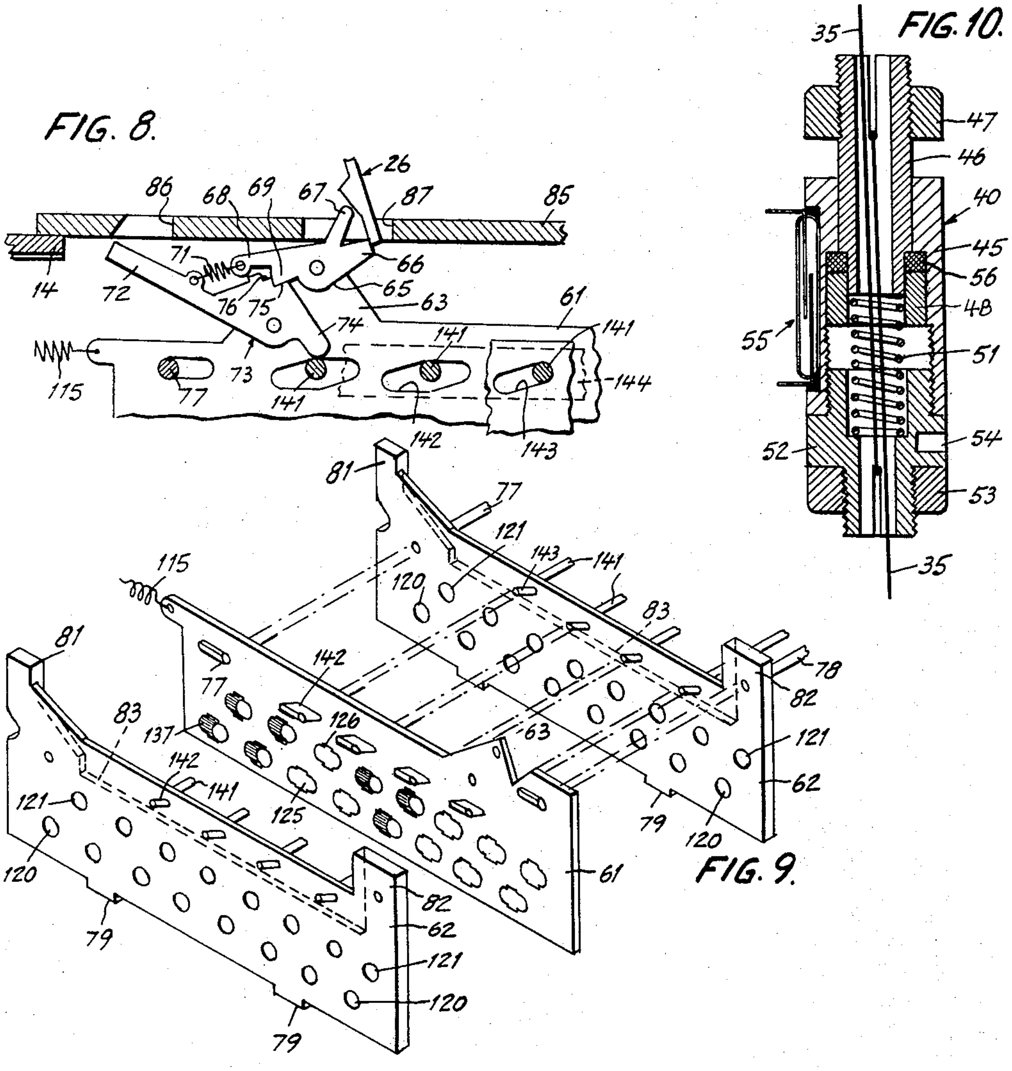
FIG. 8 illustrates the same mechanism of FIGS. 6 and 7 but in a still different operative position.
FIG. 9 is a perspective view illustrating in an exploded manner the assembly of the encoding members and associated guides therefor.
FIG. 10 is a detail of the coupling device for the ends of the cord comprising a part of the key interlock mechanism.

Depression of any one of the data key stems 18 and its key stem extension 26 operates to trigger an associated encoding member supported in the lower section of the machine for a power-driven oscillating stroke, wherein the data represented by the respective key is encoded into a combination of corresponding signals for energizing the input elements of the associated data handling or processing system. As can best be seen in FIGS. 3, 5 and 9, the lower section 10 of the apparatus contains a series of closely fitted encoding slides 61 alternately interspaced between upright guide plates 62, there being one slide 61 associated with each of the data keys or other function keys requiring a signal to be encoded in the particular system for which the keyboard is being employed. The slides 61 are in the form of relatively thin plates formed preferably of plastic material having a low friction coefficient and supported in vertical upright relation to the frame of the machine, and all are essentially of the same construction except for the relative location thereon of the triggering means associated therewith. The slides associated with the keys of each blank are identical, thus requiring in a machine as herein disclosed, having four banks of keys, only four different configurations of encoding slides, these differing only with respect to the location of a raised projection 63 formed along the upper edge thereof to which is secured the means by which the slide is triggered for a cyclic operation. As can be seen in FIG. 5, the raised projection or hump 63 pivotally supports a latching trigger or bell crank 65 having a rearwardly extending arm 66, an upwardly extending arm 67 and a forwardly extending arm 68, the latter arm being formed with a latching nose 69. The bell crank is biased in a counter-clockwise direction by a spring 71 stretched between the forward arm 68 thereof and the forwardly extending arm 72 of an interposer lever 73 also pivotally mounted on the projection 63 and formed with a rearwardly extending arm 74, said interposer being formed along its upper edge with notches 75, 76 cooperating with the nose 69 of the bell crank 65. The slides 61 are suspended on transversely extending support rods 77, 78 which are fitted through slots formed in all the slides of the entire series to enable front-to-rear movement and return in achieving their encoding function, the slides being guided for such movement by the adjacent guide plates 62 which are firmly located in precisely spaced relation within the lower section 10 of the machine by means of lugs 79 fitted into appropriately spaced openings in the lower or bottom frame plate 11, the upper edges of the guide plates 62 being formed with extensions 81, 82 fitted into grooves formed on the under surface of the guide plate 14 for the power drive means hereinafter to be described. The support rods 77, 78 are suitably secured at their ends in the frame of the machine and are given added support and rigidity by the support guides 62 through which they extend in closely fitting openings as opposed to the slotted openings in the encoding slide as can best be seen in FIG. 9. Also as seen in FIG. 9, it can be noted that the support plates, which are somewhat thicker than the encoding slides 61 and also preferably formed from plastic material having a low friction coefficient, have a portion of their thickness along their upper edge removed as at 83 for the purpose of accommodating the bell crank 65 and interposer 73 of the encoding slide contiguous thereto.

Figure 3:
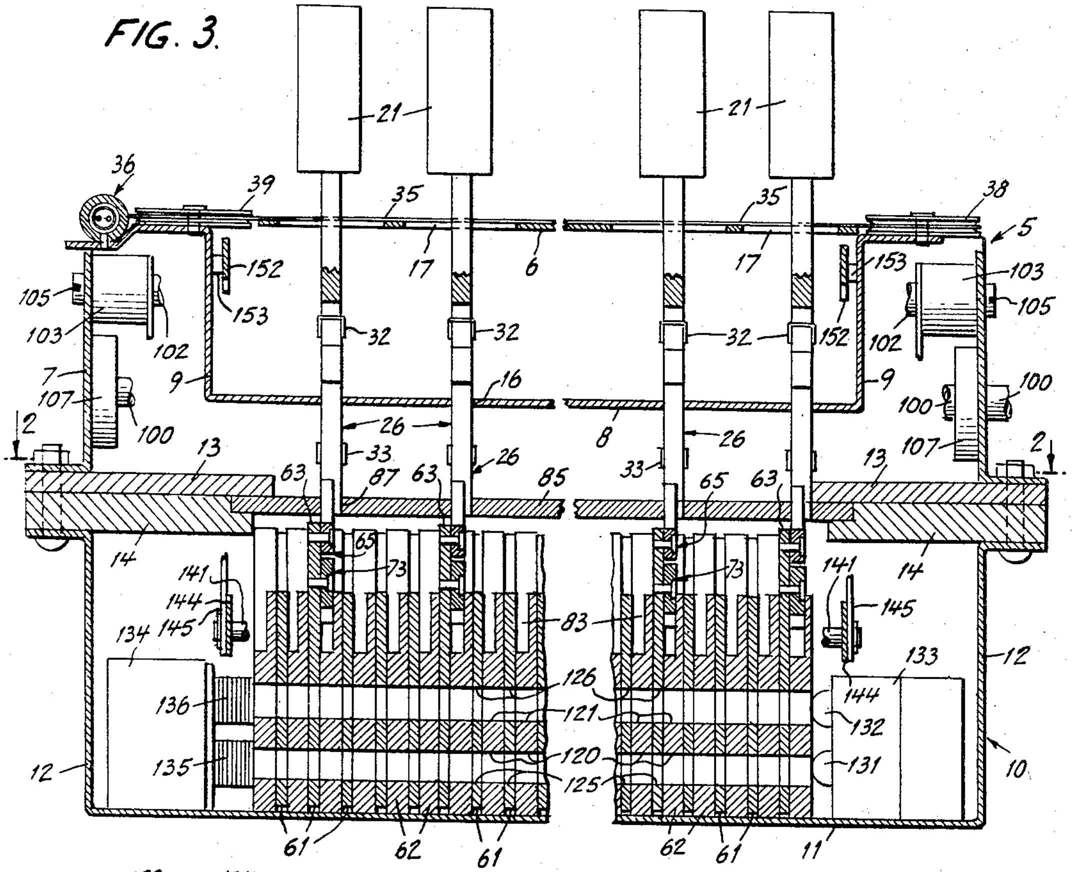
FIG. 3 is a sectional view in elevation taken along line 3—3 of FIG. 1.
Figure 4:
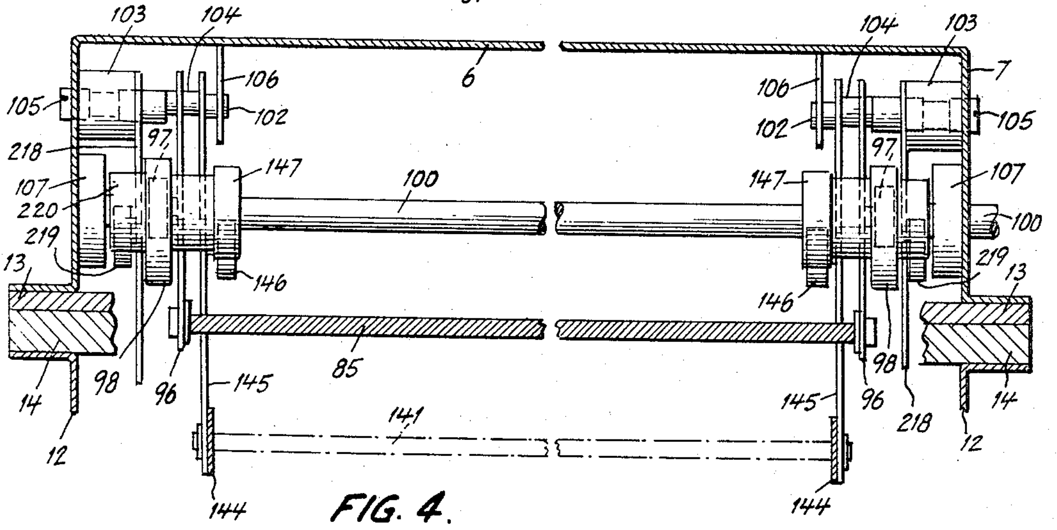
FIG. 4 is a sectional view taken along the line 4—4 of FIG. 5.
Figure 19:
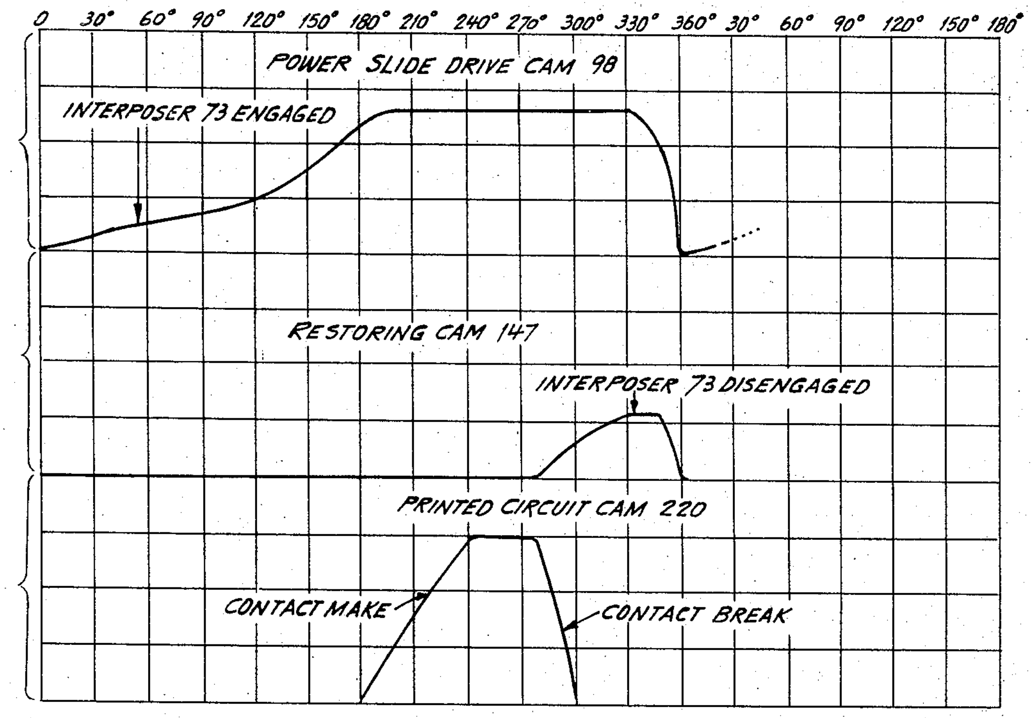
FIG. 19 is a timing diagram of the respective cams for driving and restoring the encoding members and actuating the printed circuit board of the apparatus.

The triggering of an encoding slide 61 in response to actuation of its associated key stem operates to release the interposer 73 for positive driving engagement with a power-driven grid or slide 85 supported horizontally in the guide channel formed by the frame plate 13 and notched edge of the adjacent support plate 14, see FIG. 3, said driving slide 85 having the appearance of a grid due to its having cutouts 86 to provide an interposer engaging edge for each of the interposers 72 and cutouts 87 for accommodating each of the key stem extensions 26 and their associated triggers 65, there being a pair of cutouts 86, 87 in aligned relation for each of the encoding slides 61, the paired cutouts of one row being relatively offset from those in another row to the same extent as the offset between the key stems of the respective banks of the keyboard. The power slide 85 is reciprocally driven in a front-to-rearward direction within the guideway formed between the frame plate 13 and the cutaway frame plate 14 against the tension of restoring springs 88 stretched between studs 89 carried by the slide and a spring anchor plate 91 extending across the front of the machine and suitably secured to the frame plates 13, 14, the studs 89 projecting through appropriately spaced slots 92 formed in the upper frame or guide plate 13. At its rearward edge the power slide is formed with lateral extensions 95 preferably formed with a circular cross section and pivotally secured to the lower end of cam follower levers 96, each follower lever being formed with a vertical slot for accommodating an extension 95 to enable horizontal reciprocation of the power slide by oscillation of the follower levers 96, each of which carries a follower roller 97 cooperatively bearing on a power drive cam 98 secured to a power drive shaft 100. Each follower 96 is pivotally mounted on a pivot pin 102 supported at one end in a bushing 103 suitably secured to a sidewall frame 7 and at the other end in a downwardly bent extension 106 formed from the upper frame plate 6. As can best be seen in FIG. 4, the bearing surface of the pivot pin 102 mounting the collar 104 for each follower 96 is slightly eccentric relative to the axis of the pin, one end of the pin being slotted as at 105 to enable rotative adjustment thereof which, through the eccentric bearing surface thereon, permits fine adjustment of the follower arm or lever 96 and the roller 97 thereon in relation to the power drive cam 98 to precisely set the timing of the slide 85 relative to other driven mechanism. The shaft 100 is journaled in bearings 107 secured to the side frames 7, the righthand end of the shaft carrying a drive pulley 108, see FIG. 1, around which is wound a drive belt 109 by which the shaft is coupled to a driving motor 110 having a drive pulley 111, see FIG. 2. The contour of cam 98 is such as to impart through its respective follower a cyclic oscillating motion for slide 85 having carefully calculated periods of acceleration, particularly during its rearward driving stroke to a dwell position, as represented by the timing diagram of FIG. 19.

Figure 1:
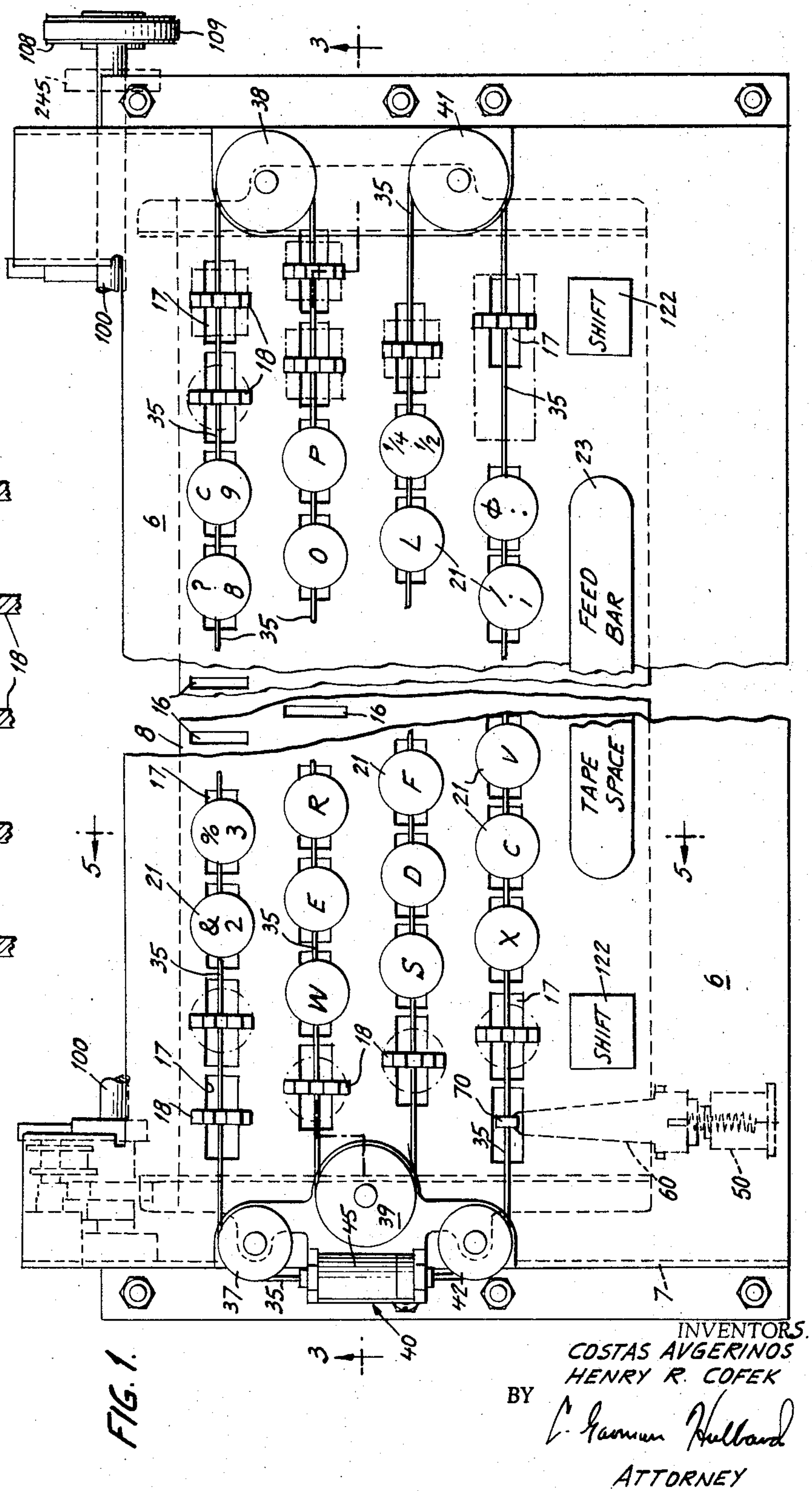
FIG. 1 is a plan view of the improved keyboard apparatus according to the instant invention.
Figure 2:
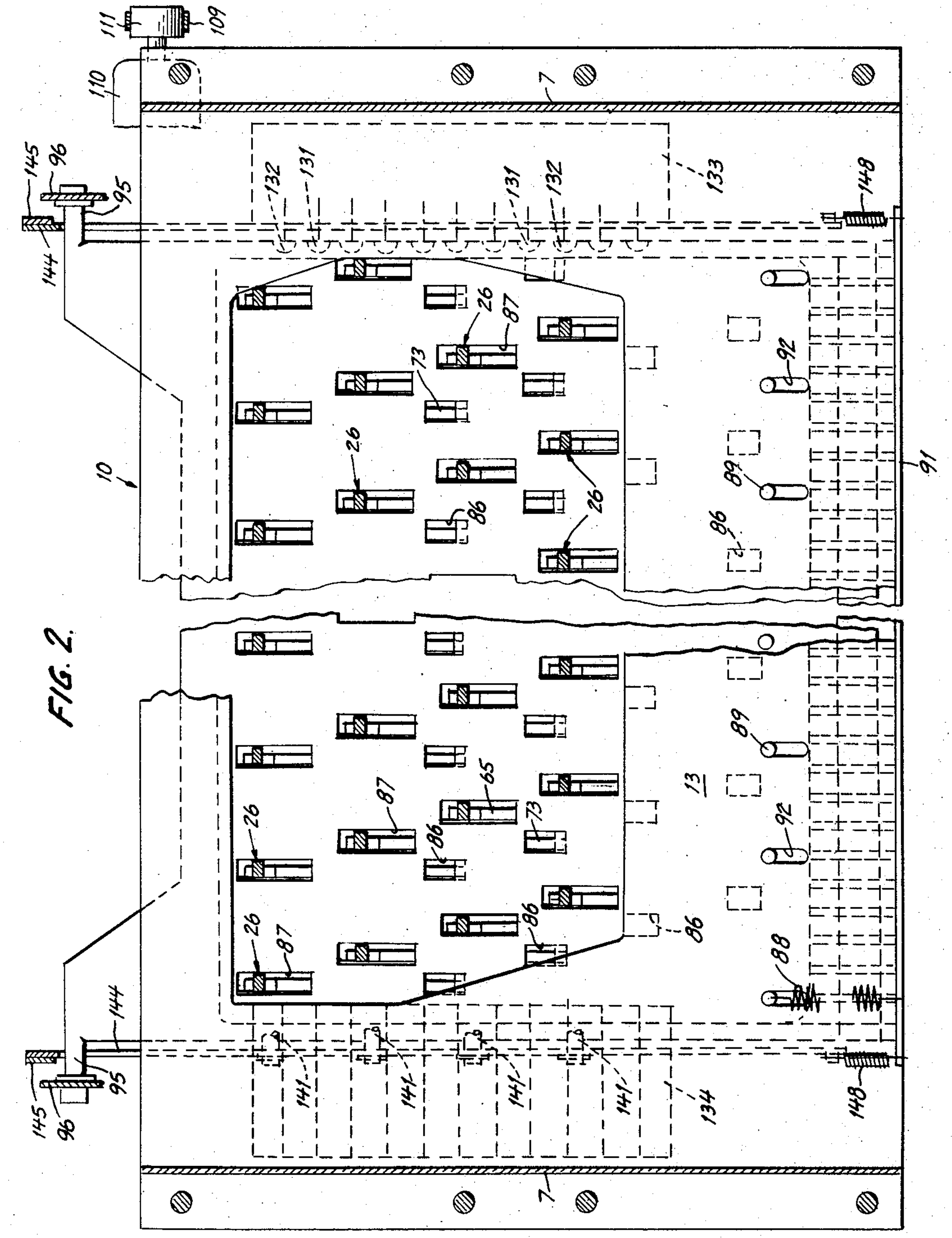
FIG. 2 is a sectional view in plan taken along the line 2—2 of FIG. 3.

The power slide 85 is effective during an operating cycle for shifting a selected encoding slide from its forward restored position to its rearward actuated position against the tension of a restoring spring 115 connecting each encoding slide to the spring anchor plate 91, to which is also connected the power slide restoring springs 88, as aforementioned, the anchor plate being pressed against the side edges of the power slide guides 13, 14 under stress of the respective springs 88, 115, the turned-in bottom edge of the plate 91 being seated in a cutout formed in the forward edge of the guide plates 62. As can best be seen in FIGS. 5 and 9, each of the guide plates 62 contains in its lower section two horizontal rows of circular openings 120, 121, there being eight openings in each row, the openings of the respective rows being staggered relative to one another, each opening corresponding to a code channel or bit position of any selected binary code into which the data represented by the respective key stems is to be encoded. In the present instance, the encoding slides and associated guide plates are designed to have the capacity for encoding into an eight-bit code with a further capacity of doubling the encoding possibilities in conjunction with case shift means whereby each key of the keyboard may be assigned two different data items for encoding into respective codes depending upon the condition of the case shift control means for which a key 122, see FIG. 1, is provided on the keyboard. As will be more fully apparent in the operating description to be described, the openings 120 of the lower row are effective in the normal or lower case shift condition of the keyboard, while the upper row openings 121 are effective in the upper case shift condition of the keyboard.

The encoding slides 61 are also provided with two rows of openings 125, 126, which are of a generally oval configuration and disposed to align with the respective openings 120, 121 of the associated guides 62 in either the restored or actuated position of the encoding slide.

As can be noted in FIG. 3, the encoding slides 61 and associated interspaced guides 62 therefore are arranged in closely spaced and compacted relation to one another, allowing just enough clearance for free sliding movement of the encoding slides, there being insufficient clearance to allow penetration between the respective slides and support guides of any substantial amount of light, whereby the aligned openings 120, 121 in the guide plates 62 in conjunction with openings 125, 126 in slides 61 define respective passages or tunnels through the entire assembly thereof, through which a beam of light projected from one side of the assembly may pass and activate a light responsive means disposed in alignment with said tunnels or passages on the opposite side of the assembly. As best seen in FIG. 3, a row of lamps 131, 132 mounted in a suitable housing 133 is provided on the right-hand side of the assembly, each lamp 131 providing a light source in alignment with a respective one of the passages or tunnels defined by the openings 120, 125 in the respective guide plates and encoding slides, the lamps 132 being similarly disposed with respect to the passages defined by the upper row of openings 121, 126 of the respective parts. Mounted on the lefthand side of the assembly in a suitable housing 134 which also contains control circuitry, hereinafter to be described, are two rows of light responsive photo cells 135, 136, the photo cells 135 aligning with the lower light-conducting passages or tunnels and the photo cells 136 aligning with the upper row of passages through the assembly. Referring to FIG. 5, it will be noted that certain of the oval-shaped openings 125, 126 of the encoding slide 61 are partially blocked by an insert piece 137 occupying at least the forward half of the respective opening and leaving open a circular area in the rearward half of the respective oval-shaped opening. When the encoding slides are in their most forward or restored positions, it is the rearward half of the respective oval-shaped openings 125, 126 which align with the circular openings 120, 121 in the interspaced guide plates 62, but when the encoding slides are actuated to their rearmost effective encoding position, it is the forward half of the slotted openings 125, 126 which aligns with the corresponding openings 120, 121. Accordingly, when an insert 137 is secured by any suitable means such as adhesive, heat sealing or the like within the rearward half of an opening 125, 126, the insert will not interfere with light passage through the respective passage ways while the encoding slides are in their restored positions, but the inserts will interrupt the respective passage way when the encoding slide is actuated to its effective rearward encoding position by intercepting passage of light from the associated lamp 131, 132 at one side of the assembly to the associated photoelectric cell 135 or 136 at the opposite side of the assembly. The control circuit is conditioned to normally receive light from all of the lamps under which circumstances no encoding signal is generated. When a photo cell is blocked or shielded from its light source, the resulting change in resistance within the cell becomes effective for generating a corresponding signal in the respective channel or bit position of the code being employed.

FIG. 5 illustrates the encoding slide 61 employed in conjunction with a key in the rearmost or upper bank of keys and which, in this particular instance with the code herein utilized, will be the key representative of the numeral "3" and the symbol "%." As will be noted from the operational views illustrating various stages of the triggering of the respective code slide by key operation, manual depression of the key top, associated key stem 18 and key extension 26, in addition to flexing the interlock cord 35, operates to strike the top edge of the rearward arm 66 of the latching bell crank 65 and in so doing rocking same from the position shown in FIG. 5 to that shown in FIG. 6. During this movement, nose 69 of the latch 65 disengages from notch 75 of the interposer 73 enabling the interposer to rock in a lockwise direction under tension of spring 71 until limited by the notch 76 therein engaging with the nose 69. In this rocked position the free end of the forward arm 72 has been raised into effective engageable relation to the forward edge of the cutout 86 in the power slide 85, there being a slight amount of clearance between the edge of the arm 72 and said edge of the cutout when the slide is in its most forward or fully restored position to enable free movement of the arm into its effective interposed position as shown in FIG. 6. During this same motion, the upstanding arm 67 of the latching bell crank 65 bears against the camming shoulder 29 of the key stem extension to swing the key stem extension counter-clockwise agianst the tension of its biasing spring 31 so as to disengage and hold disengaged the key stem extension from the arm 66. Assuming machine timing to be such as to complete a cycle between 0° and 360°, it will be noted that the clearance between the tip of the interposer arm and the forward edge of slot 86 allows for a slight amount of lost motion before the interposer arm 72 is engaged by the edge of the slot, the power slide 85 being momentarily accelerated starting at 0° of the cycle and then decelerated so as to have a relatively low velocity at the moment of picking up the interposer arm 72 which, as can be seen in the timing diagram of FIG. 19, occurs at about 55° so as to start the rearward sliding action of the encoding slide 61 in a gentle manner. The power slide thereafter begins to accelerate at an increasing rate to about 180° of the cycle at which time it decelerates to reach zero velocity or the dwell position of the driving cam at about 200° of the cycle whereat the encoding slide is at its fully actuated rearward position and remaining so until about 330° of the cycle, at which time it starts to restore in a forwardly direction, reaching its fully restored position by 360° of the cycle.

In both FIGS. 5 and 6, the power slide 85 is shown in its fully restored position at 0° of an operating cycle. In the event the machine is operating in a synchronous manner, with the power slide 85 constantly reciprocating, the triggering of the interposer latch 65, as above described, could of course occur at any point or time in the operating cycle and, when occurring during an operating stroke of the power slide, the interposer arm 72 will bear against the bottom surface of the power slide 85, in particular, the bottom surface of the slide forwardly of the associated notch 86, in which position the interposer nose 69 will be partly engaged in the notch 76. As the power slide 85 approaches its restored position, the interposer finger 72 will snap into effective interposing position in preparation for the next operating cycle, during which it will be picked up to actuate the associated encoding slide at about 55° thereof, as aforesaid.

Figure 7:
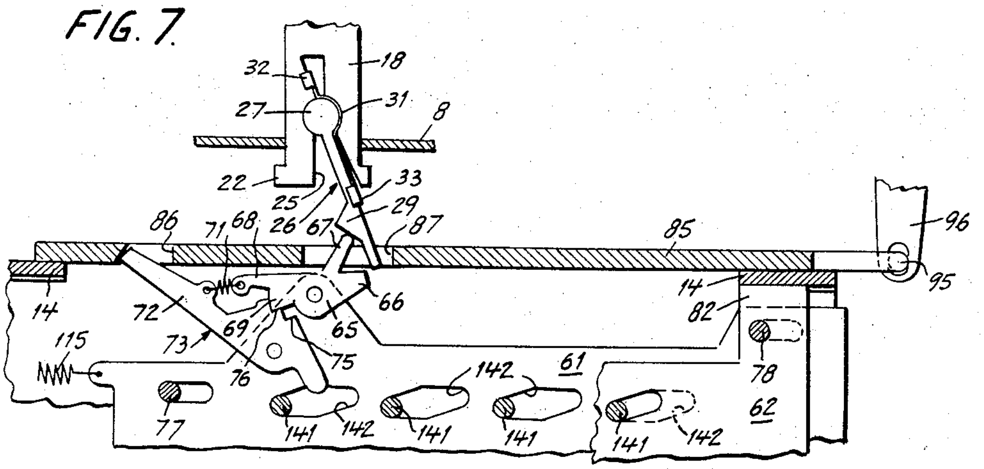
FIG. 7 illustrates the mechanism of FIG. 6 in a still different operative position.

FIG. 7 illustrates the position of the parts when the encoding slide is at the fully actuated position wherein the forward half portions of the openings 125, 126 become aligned with the associated openings 120, 121 in the respective encoding slide guide plates 62. In the position shown in FIG. 7, it will be noted that the upstanding arm 67 of the interposer latch, bearing on the key stem extension shoulder 29, has swung the key stem extension 26 in a counter-clockwise direction so as to maintain the lower tip of the key stem extension removed from and clear of the rearwardly extending arm 66 of the interposer latch lever 65.

Near the end of the dwell representing the fully actuated position of the power slide 85, restoring mechanism is operated to release the interposer 73 from engagement with the power slide and reset the interposer latch 65, whereupon the encoding slide restores under influence of its restoring spring 115 before the power slide 85 is restored under control of the power drive cams 98. The restoring means for the encoding slides includes a series of restoring rods 141 extending laterally through the assembly of the encoding slides and guide plates as accommodated for by openings 142 in each of the encoding slides disposed in alignment with camming slots 143 in each of the support plates 62. The rods 141 are carried at each end thereof by arms 144, the rearward ends of which are joined by a pivotal pin and slot connection with a respective follower lever 145. The follower levers are mounted on the pivot pins 102 and carry a follower roller 146 disposed in bearing engagement with a restoring cam 147 mounted on the drive shaft 100, the roller being maintained and biased into engagement with the cam by means of springs 148 stretched between the forward ends of the restoring arms 144 and the spring anchor plate 91, see FIG. 2. Cam 147 operates to positively drive the restoring slides 144 in a rearwardly direction against the tension of springs 148, causing the restoring rods 141 to ride up the inclined slots in the guide plates 62 and in so doing engaging the rearwardly extending arm 74 of any interposer which may have been tripped and to rock same in a counter-clockwise direction from the position shown in FIG. 7 to that shown in FIG. 8. This disengages the forward arm 72 of the interposer from the power slide 85 and at the same time enables the interposer latch 65 to become reset with its nose 69 engaging in the notch 75 of the interposer. FIG. 8 shows the position of the parts when reset by operation of the restoring rods 141 and, at the exact moment thereof, before the encoding slides have been restored under influence of their restoring springs 115. By reference to the timing diagram of FIG. 19, it will be noted that the restoring cam 147 becomes effective at about 275° of the cycle to initiate the restoring action which is completed at about 330° of the cycle. As the encoding slides return to their restored position, the key stem extension 26 is prevented from swinging over and above the top edge of the latch arm 66, in the event the key should be held depressed, due to the coaction between the shoulder 29 and the upstanding arm 67 which holds the key stem clear of the latch arm during the resetting thereof by the restoring rods, thereby preventing repeat actuation of an encoding slide in the event that the key should be held depressed after a cycle's operation and requiring that the key first be released and again depressed before the same encoding slide can again be actuated. It will be noted that the geometry of the interposer latches 65 and the interposer 73, and the locations thereon to which the interconnecting spring 71 is attached, gives rise to a relatively low moment of force exerted by the spring on the latch 65 which provides very slight resistance to key operation, thereby contributing to a very easy and light touch for the keyboard. The moment of force exerted on the interposer 73 is somewhat greater, however, to give a quick and definite response when triggered for assuring engagement of the forward edge of the interposer arm 72 with the forward edge of its respective slot 86 in the power slide 85.

FIG. 5 illustrates the code slide 61 associated with the data key for encoding "3" in the lower case condition of the keyboard and "%" in the upper case condition of the keyboard. As will be noted in FIG. 5, the lower row of openings 125 in the slide are provided with inserts 137 in the first, second and fifth opening of the row counting from the left, all other openings in the lower row being devoid of the inserts 137. Accordingly, when the encoding slide is actuated in response to depression of the "3" key, the inserts 137 will be effective for intercepting passage of light through the respective first, second and fifth lower row light-conducting passage or channel through the assembly to result in the generation of parallel signals in the first, second and fifth channel or bit position of the data code for which the keyboard may be adapted. FIG. 15 is a diagram of a typical binary six-bit code which may be employed with the apparatus in which the six-code channels, reading from right to left in FIG. 15, correspond to the first six openings 125, or 126 of a code slide counting from left to right as seen in FIG. 5. The code illustrated in FIG. 15 is only typical, and it should be understood that a code employing fewer channels could similarly be employed as well as a code using a greater number of channels, there being provided in this instance eight openings 125, 126 in the encoding slides and eight respective openings 120, 121 in the guides for accommodating codes employing up to eight channels to allow for wide flexibility in the particular code the user may wish to employ. In the present instance, the seventh and eighth channels for which provision is made in the structure of the encoding slides is not employed, but they could be utilized in different codes or if, for example, the same code as shown in FIG. 15 were employed but with provision made for a parity bit which would require an extra channel or bit position in addition to the six channels shown in the FIG. 15 diagram. Referring to the diagram, it will be seen that the code for "3" is represented by a signal, indicated by a dot on the diagram, in the first, second and fifth channels.

Similarly, the code for representing the symbol "%" makes use of the first, second, fourth and fifth channels, and by reference to FIG. 5, it will be noted that the encoding slide 61 therein shown includes an insert 137 in the first, second, fourth and fifth upper row opening 126 counting from the left. Whether the upper row openings 126 or lower row openings 125 are effective in a given cycle depends upon the case shift condition of the keyboard, as hereinafter more fully explained.

In the case of the "Tape feed-Space bar" key, the key top 23 and key stem 24 of which are also shown in FIG. 5, the construction is slightly modified in that the key stems 24, of which there are two in this instance due to the length of the key top 23, one of the key stems 24 being shown in FIG. 5, do not have a key stem extension but instead are provided with a stud 151 disposed to bear on the forward extremity 155 of a bail 152. The forward end 155 of the bail is bent into position to underly the stud 151, and the bail 152 extends rearwardly along the sides of the keyboard assembly being pivoted at its rearward ends as at 153 to the side frames 9 of the keyboard assembly. The bail 152 is disposed in overlying engagement with a stud 154 extending from the side of a key stem 18 disposed at the end of the first bank of keys and threaded by the interlock cord 35 but not having any key top. The key stem 18, however, has the same associated key stem extension and encoding slide means as the other data keys of the keyboard, whereby depression of the "Tape feed-Space bar" key 23 will operate through the bail 152 to actuate its respective encoding slide in the same manner as that just described in conjunction with the "3" and "%" key FIG. 14 is a circuit diagram of a photoelectric encoding circuit adapted for use with encoding slides in the embodiment thereof illustrated in FIGS. 5–9, heretofore described. The circuit shown is for encoding into a six-channel code and, as will be seen, the lamps 131, 132 are shown in the circuit in a single row with each so oriented as to direct its beam of light toward an associated photo cell 135, 136, respectively, also arranged in the diagram in a single row although illustrated in FIG. 3 in lower and upper rows, respectively. Power supplied from a DC power supply 160 having its negative terminal connected to a common ground lead 161 and its positive terminal connected to a common lead 162 for energizing the lamps 131, 132 in parallel, the lamps being grounded over a common line 163 joined to the negative common lead 161. The photo cells 135, 136 are connected in parallel to a common ground line 164 and a common positive line 165, the anode of each photo cell being joined to the common line 165 through a resistor 166. The signal generated by each photo cell is fed to an associated amplifier 167, the amplified signal in turn being fed, preferably as an input to an "and" gate 168, the output of which energizes a respective load device 170, constituting the input means of the associated data processing system. This may, for example, represent an energizing coil for a tape punch or a magnetic tape record head or any such similar device for handling parallel input of signals representative of encoded data, the circuit being completed from the load device to the common ground line 161.

It will be noted that the "and" gates 168 with their respective load devices 170 are each connected to two amplifiers 167 in a paired arrangement wherein the two amplifiers feeding an amplified signal to the same load device would represent the same bit position or channel of the data code but which are effective, mutually exclusively, depending upon the case shift condition of the keyboard. The amplifiers are energized through a circuit extending from the power supply positive terminal to a transfer switch 175 which is operated by either one of the shift keys 122 on the keyboard, the switch being normally in the lower case condition which is its position shown in FIG. 14 wherein it can be seen that the power supply feeds a common line 176 which energizes all of the amplifiers 167 associated with the photo cells 135, which are the photo cells in the lower row thereof effective only in the lower case condition of the keyboard. Actuation of the case shift key 122 transfers the circuit to a common line 177 which energizes all of the amplifiers 167 associated with the photo cells 136 which are the upper row of photo cells effective only in the upper case condition of the keyboard. The "and" gates 168 are preferably provided to enable simultaneous and synchronized energization of the load devices 170 and are adapted to receive a synchronizing or timing pulse signal over a common synchronizing line 178 generated by any suitable switch or contact means 180 which may be a microswitch or the like under the control of the drive shaft 100 so as to supply a pulse to the "and" gates 168 at a predetermined point in the operating cycle to permit the amplified encoding signals to energize the appropriate load devices 170. Accordingly, in the case of the encoding slide 61 associated with the "3" and "%" key diagrammatically shown in FIG. 14 in the actuated position, the encoding slide inserts 137 will intercept the light in the first two channels regardless of the case shift condition of the keyboard so as to result in energization of the first two, reading from the left, load devices 170. The third load device 170 will not be energized since there is no insert 137 in either the upper or lower row of openings of the encoding slide. The load device for the fourth channel of the code will not be energized as long as the case shift key 122 is nonactuated, as shown, since the insert 137 associated with the fourth channel of the code is located in the upper row of openings in the encoding slide so as to be effective for intercepting light only in the upper case condition of the keyboard, there being no corresponding insert 137 in the lower row of openings of the encoding slide for intercepting light to generate an encoding signal when the keyboard is in the lower case condition. The load device 170 for the fifth code channel will be energized regardless of the case shift condition of the keyboard since there is an insert 137 for intercepting light to the two photo cells 135 and 136 controlling the fifth channel position, There being no insert 137 for the sixth channel position of the code, the sixth load device 170 will not be energized regardless of the case shift condition of the keyboard. Accordingly, only the first, second and fifth load devices 170 will be energized under the conditions shown in the diagram of FIG. 14. However, if the case shift key 122 should be depressed to encode "%," the circuit would be effective for energizing the first, second, fourth and fifth load devices 170 in accordance with the "%" code as shown in the diagram of FIG. 15.

Figure 16:
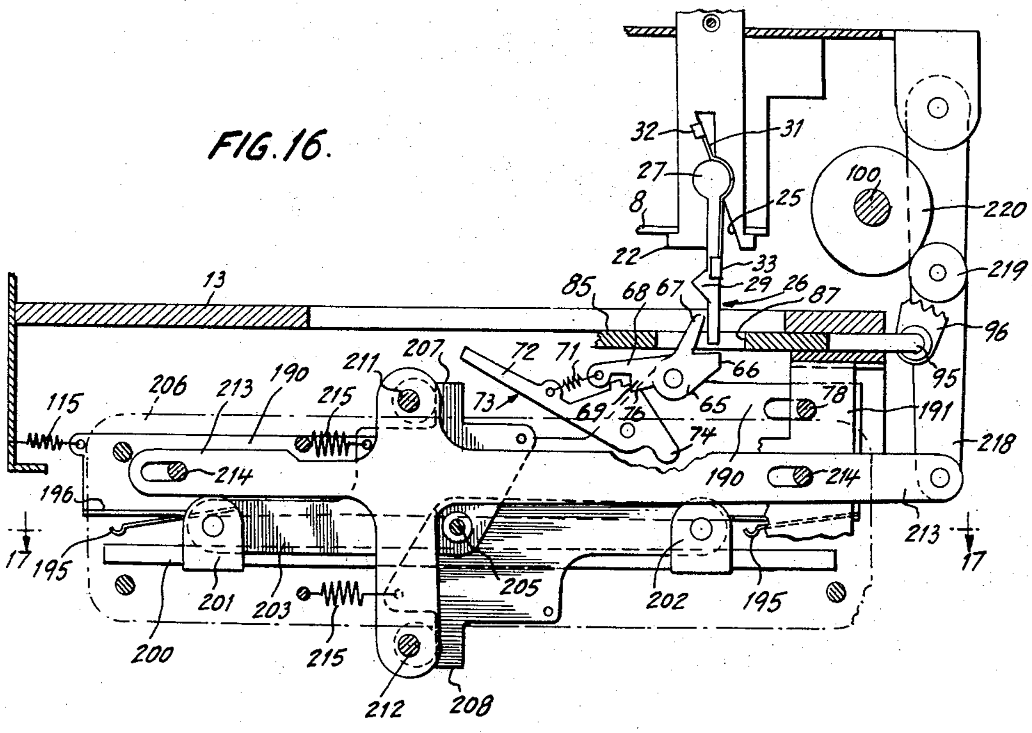
FIG. 16 is a view in side elevation of another embodiment of the invention utilizing a modified encoding member and printed circuit means for achieving the encoding function.

In FIG. 16 is illustrated a slightly modified form of the invention employing an encoding means utilizing printed circuitry and employing encoding slide means slightly modified from that heretofore described but utilizing the same keyboard structure and means for triggering the respective encoding means.

As shown in FIG. 16, the encoding slides 190 are mounted similarly to the slides 61 of the first described embodiment but differ therefrom in that they are shorter in height than the slides 61 and are devoid of any cutouts in the lower portion thereof. The interspaced slide support plates or guides 191 are similarly shortened in height and are devoid of any openings in the lower portion thereof. The bottom edges of the encoding slides 190 are adapted to receive at selected locations therein spring contacts 195 cooperating with a printed circuit board 200 underlying the entire assembly of slides 190 and guides 191 and carrying on its upper surface conductive material in a printed circuit layout which can be best seen in FIG. 17. The spring contacts 195 are of a width somewhat less than half the thickness of a slide 190 so as to enable, if called for by the code, contacts 195 to be located in side-by-side relation on the same slide. Disposed along the bottom edge of each encoding slide on opposed sides thereof are layers of electrically conductive material 196, insulated from each other by the material of the slide but making contact with any spring contact 195 inserted along the same side of the respective encoding slide. Preferably, the under or bottom edge of the encoding slide 190 is slotted at a slight angle thereto to provide means for inserting an end of the spring contacts 195 which are firmly seated therein by adhesive or other suitable means so as to locate the contacts 195 at precise predetermined positions along the bottom edge of the slide for cooperation with the associated printed circuit board 200.

The printed circuit board 200 is supported at four points, two on each side, by angularly bent ears or brackets 201, 202, two of which are seen in FIG. 16, underlying the board and secured thereto by any suitable means, the upstanding portion of the ears each being pivotally secured to a respective bell crank 203, 204, each of the bell cranks being pivotally mounted on a pivot stud 205 supported in the side frame 206 of the assembly. The bell cranks, 203, 204 are formed with extension 207, 208, respectively, adapted for engagement by eccentric studs 211, 212 carried by an actuating link 213 supported for sliding movement on guide studs 214 mounted in the side frame 206. Springs 215 stretched between each bell crank 203, 204 and the frame serve to bias each bell crank in the direction wherein its projection 207, 208 will bear against its respective eccentric stud 211, 212, the force of the springs also serving to maintain the actuating link 213 in its normal forward position wherein the printed circuit board 200 is maintained somewhat below and in spaced relation to the associate spring contacts 195. The rearward end of link 213 is pivotally joined through a pin and slot connection to the bottom end of a follower lever 218, the upper end of which is journaled on the pivot pin 102, which lever 218 carries a follower roller 219 cooperating with an actuating cam 220 mounted on the main drive shaft 100. Cam 220, at an appropriate time of an operating cycle, causes the follower lever 218 to rock counterclockwise pulling rearwardly on the link 213 to cause the bell cranks 203, 204 to rock in a direction which will elevate the printed circuit board 200 to bring the printed circuit thereon into contact with the spring contacts 195 of any encoding slide which may have been actuated in the same cycle. This mechanism avoids any wiping contact between the spring contacts 195 and the printed circuit as the encoding slides are actuated, thus minimizing wear on the contacting surfaces and providing a more reliable and longer lasting means for completing circuits representative of encoded data by printed circuit techniques than otherwise would be possible. As can be noted by reference to the timing diagram in FIG. 19, the cam 220 becomes effective at about 180° of the cycle to raise the printed circuit board 200 to its fully elevated position at about 240° of the cycle and to lower it starting at about 280° of the cycle. Contact is made at about 220° which is a time of the cycle at which the encoding slides are in their fully actuated positions, the circuits being held until about 285° of the cycle, which is prior to the time the interposers 73 are disengaged to permit the encoding slide to restore, the printed circuit board 200 being fully returned to its lowermost position and out of engagement with the spring contacts 195 before the encoding slides are able to restore to their normal ineffective position. The eccentric studs 211, 212 enable a fine adjustment to be made between the actuating link 213 and the associated bell cranks 203, 204 in order that the spacing and planar orientation of the printed circuit board may be closely and precisely adjusted such that the encoding circuits will be simultaneously completed at the predetermined point of the operating cycle.

Figure 17:
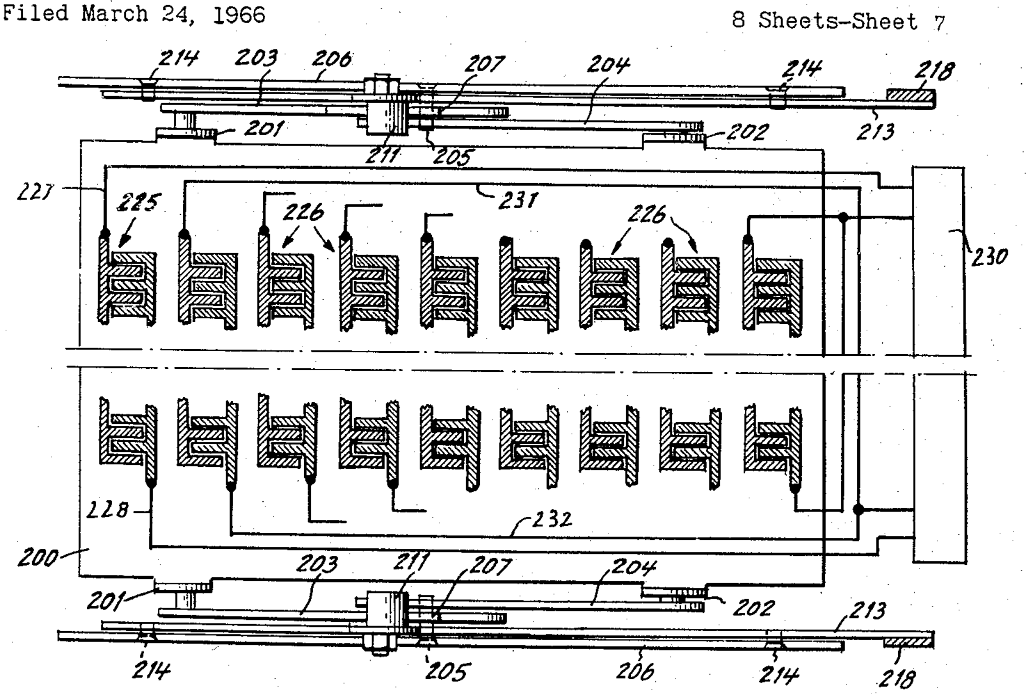
FIG. 17 is a sectional view taken along the lines 17—17 of FIG. 16 and illustrating a printed circuit board which may be employed in this embodiment of the invention.

The printed circuit, as can best be seen in FIG. 17, includes conductive material arranged in a series of nine patterns of interleaved contact segments of which the first pattern 225, reading from the left in FIG. 17, is a common input having interspaced segments making contact with a spring contact 195 serving as an input for one side of an encoding slide and the other alternate segments of the pattern making contact with the spring contact 195 serving as the input for the other side or half of the encoding slide. The other eight patterns 226 enable completion of encoding output circuits in selected combinations within the respective code depending upon the specific location of the spring contacts of the respective actuated encoding slide, it being understood that any one encoding slide may be provided with spring contacts which, when the slide is actuated, will make contact with two adjacent contact segments of the respective printed pattern. Said adjacent segments, however, are effective only in a mutually exclusive manner by virtue of the case shift mechanism which will energize only one of the two adjacent segments of the common printed circuit pattern 225 associated with a given slide in the same circuit logic as is employed with the photoelectric encoding means heretofore described.

As can be seen in FIG. 17, the upper case and lower case segments of the common input printed circuit pattern 225 are connected by separate leads 227, 228, respectively, running to a terminal board 230. The lower case and upper case contact segments of each of the printed circuit patterns 226 are connected to the terminal board 230 through leads 231, 232, respectively, which are in each case joined together in a common connection at said terminal board which serves to connect each printed circuit pattern 226 with a respective load device to be energized by the encoded signals, not shown in FIG. 17.

Figure 18:
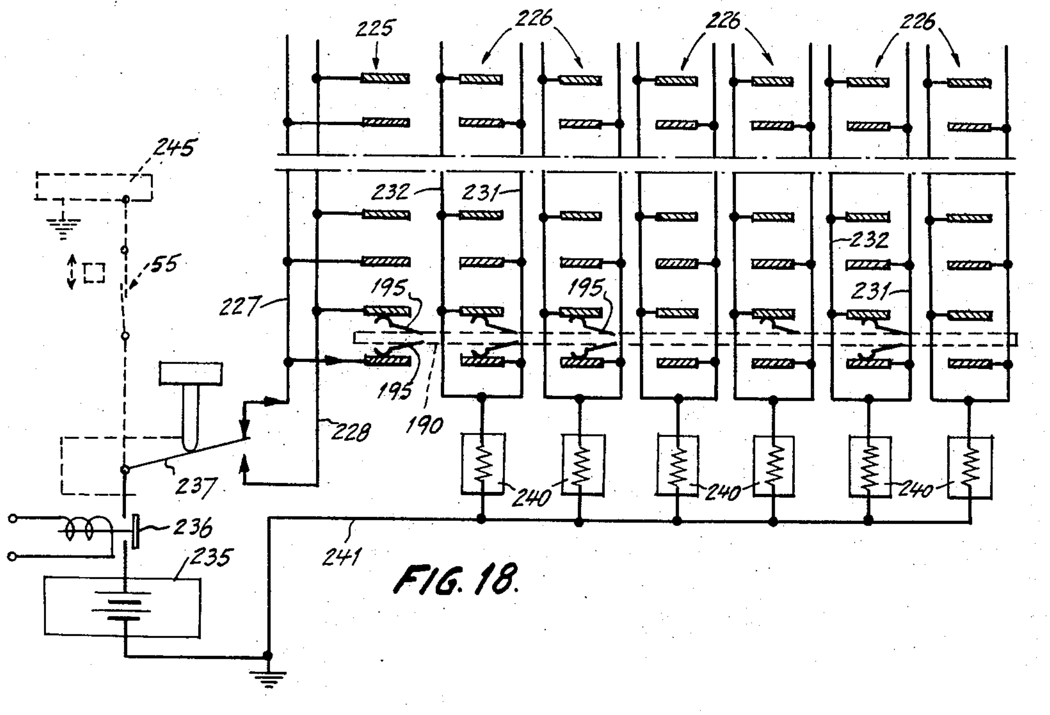
FIG. 18 is a diagrammatic showing of the encoding circuit utilized in the embodiment of the invention shown in FIGS. 16 and 17.

FIG. 18 illustrates diagrammatically the encoding circuit logic employed in the use of the printed circuit board 200. As therein seen, the circuit includes a power source 235, the positive terminal of which is connected to ground, the negative terminal of which runs to a normally open switch 236, which is preferably employed and utilized as a synchronizing means for energizing the printed circuit board at a predetermined time of operating cycle and for a predetermined duration occurring within the period between 240° and 280° of the cycle, at which time the printed circuit board is in its most elevated position and making electrical contact with the contacts 195 of any encoding slide 190 which may have been actuated. The switch 236 may be of any suitable type and is shown as a solenoid-actuated circuit breaker although it could be a relay, reed switch, cam-actuated microswitch or equivalent device, preferably under control of the main drive shaft of the machine for closing the circuit during the predetermined interval of an operating cycle and thus serving as a means for eliminating arcing between the contacts 195 and their respective contact segments of the printed circuit board. The circuit continues from the switch 236 to a transfer switch 237 having the same function as the transfer switch 175, heretofore described in conjunction with the FIG. 14 embodiment of the invention, and operated by the case shift key 122. In the lower case condition, as shown, the switch 237 makes contact with the lead 227 energizing the lower case contact segments of the printed circuit pattern 225 of the printed circuit board. Depression of the case shift key 122 causes the circuit to be completed to the lead 228 running to the upper case contact segments of the printed circuit pattern 225 of the printed circuit board. FIG. 18 illustrates the encoding slide 190 associated with the key for encoding slide 190 association with the key for encoding either "3" in lower case or "%" in upper case, the slide being in the actuated position and having contacts 195 disposed so that in the upper case condition of the keyboard circuits will be completed through said contacts 195 to the lower case contact segments of the first, second and fifth printed circuit patterns 226, reading from left to right, thereby completing circuits over leads 231 to the respective first, second and fifth load devices 240, each of which is connected through a common lead 241 to ground, to thereby complete the selected combination of circuits in accordance with the code for energizing the associated data processing system. Depression of the case shift key 122 will result in the circuit being transferred to the lead 228 which, due to the disposition of the contacts 195 on the other side of the encoding slide 190, will cause encoding circuits to be completed to the first, second, fourth and fifth load device 240 in accordance with the assigned code for "%." In a similar manner the actuation of the encoding slide 190 associated with any other data key will be effective for energizing the load devices 240 in the desired combination in accordance with the code which may be assigned to the respective data key of the keyboard.

As heretofore mentioned, the keyboard may be operated in a synchronous or an asynchronous manner regardless of which embodiment of encoding means may be employed. In the synchronous mode of operation it should be understood that the main drive shaft 100 is continuously driven from the motor 110 connected to the power source through a suitable "on-off" switch, not shown, maintaining the power drive slide 85 continuously oscillating so as to pick and actuate the respective encoding slide in the operating cycle following that in which the respective slide was triggered by its associated data key of the keyboard. In the synchronous mode of operation it will be understood that the circuit controlling means provided for by the reed switch 55, heretofore described, would not be employed. In the asynchronous mode of operation said reed switch 55 is employed to complete a circuit, shown alternatively in the diagrammatic view FIG. 18, extending from the transfer switch 237 to a one-revolution clutch 245 and then to ground, the clutch 245 for this mode of operation being of any suitable type and mounted on the driven end of the main drive shaft 100, see also FIG. 1, so as to normally dissociate the drive shaft from its driving source of power, motor 110, and to effectively drive the shaft 100 for one revolution only in response to each actuation of one of the data keys of the keyboard.

While there are shown and described what are considered to be preferred embodiments of the invention, it of course will be understood that obvious changes could be made therein without departing from the spirit of the invention. It is, therefore, intended that the invention be not limited to the specific forms herein shown and described nor to anything less than the whole of the invention herein disclosed and as hereinafter claimed.

We claim:

1. An encoding keyboard for producing encoding signals representative of data to be entered into an associated data processing system comprising, a plurality of data indicative keys, each manually operable through a data entry stroke of uniform extent and including key stem means guided to enable movement of the respective key through a data entry stroke, an encoding member for each of said keys mounted for linear sliding motion to and from an effective encoding setting, electrical means responsive to the movement of an encoding member into an effective encoding setting for generating a combination of electrical signals unique to the respective encoding member, a power-driven member mounted to oscillate in a linear path of motion for positively driving an encoding member into said effective encoding setting, normally ineffective interposer means carried by each encoding member, means for releasing said interposer means in response to operation of the respective data key for positively engaging with said power-driven member to cause an encoding member to be driven thereby into said effective encoding setting and trigger means carried by each encoding member, said trigger means mounted adjacent to and for cooperative engagement with the respective interposer means carried by the encoding member, said trigger means adapted to render said interposer means normally ineffective and actuable for rendering said interposer means effective for engaging with said power-driven member in response to operation of the respective data key.

2. The invention according to claim 1 wherein said trigger means includes a latch member pivotally mounted on said encoding member and biased into limiting engagement with said interposer means, said interposer means being pivotally mounted on the encoding member and biased toward effective interposing relation with said power-driven member.

3. The invention according to claim 2 including a key stem extension pivotally mounted on each key stem and disposed to engage one arm of said latch to actuate same for releasing the respective interposer means upon operation of the respective data key, said latch having another arm effective upon actuation of the latch to disengage said key stem extension from said one arm at the completion of the data entry stroke of said key.

4. The invention according to claim 1 wherein each encoding member comprises an opaque plate formed with a plurality of openings including at least one opening for each channel of the code for said encoded signals, said plates being arranged in parallel relation to one another in an encoding assembly wherein the respective openings in said plates align with one another when said encoding members are in their restored ineffective setting, and wherein said electrical means include light sources directed through the respective openings from one side of said assembly and photo cell means registering with said openings on the other side of said assembly, selected openings of the respective encoding members being restricted in size causing an encoding member to intercept the passage of light through said assembly to thereby generate a combination of code signals unique to the encoding member in the effective setting and representative of the data assigned to the respective data key, each encoding member including two openings for each channel of the code, and said electrical means includes a transfer switch which in one position renders one set of said openings effective for generating encoded signals representative of one item of data, said switch in another position rendering the other set of openings in the same encoding member effective for generating different encoding signals representative of a different item of data assigned to the same data indicative key.

5. The invention according to claim 1 wherein said electrical means include at least one set of contacts electrically connected and mounted at selected locations along one edge of each encoding member, and a printed circuit board having electrically conductive portions disposed for selective engagement by said contacts when the encoding member is in its effective setting for completing a combination of circuits in the code for the data represented by the respective encoding member, wherein said printed circuit board being normally disposed in spaced disengaged relation to said contacts, and means for moving said printed circuit board into engagement with the contacts on an encoding member after said encoding member has been driven to its effective setting.

6. The invention according to claim 5 wherein said moving means disengages said printed circuit board from said contacts while the encoding member is maintained in its effective encoding setting.

7. The invention according to claim 1 wherein said electrical means include two sets of contacts mounted at selected locations along one edge of each encoding member, the contacts of each set being electrically connected with each set electrically insulated from the other, said electrical means also including a printed circuit board having electrically conductive material disposed for engagement by said contacts when the encoding member is in its effective setting, said contacts completing combinations of circuits in accordance with the code for the data represented by the respective encoding member, said electrical means further including switching means rendering one or the other set of said contacts effective for generating distinct and different combinations of code signals depending upon the setting of said switching means.

8. In a keyboard apparatus of the character described having a plurality of data keys each manually operable through a data entry stroke of uniform extent and effective for entering its respective data in the latter half portion of its data entry stroke, each key comprising a key stem arranged in at least one aligned row, said apparatus including fixed guide means disposed in a plane intersecting the stroke path of said keys and supporting each of said key stems for movement relative thereto during each data entry stroke, interlock mechanism comprising endless flexible means threaded through the key stem for each of said keys and supported between adjacent keys by said guide means, said endless means being adapted to flex at the point of its engagement with a key stem when said engaged key stem is operated through a data entry stroke, said endless means being detached from said guide means and having an overall length sufficient to permit flexing thereof only to the degree required by one of said keys when operated to effect a data entry stroke, and endless means including a cord-like member threaded through said key stems and a coupling device yieldably joining the ends of said cord-like member, said device adjustable to provide a predetermined extent of yield between the ends of said member to thereby determine the extent of a data entry stroke by limiting the degree of flexure of said member when a data key is operated, said device yieldably tensioning said member to maintain said data keys in their normal inactivated position.

9. In a keyboard apparatus of the character described having a plurality of data keys each manually operable through a data entry stroke of uniform extent and effective for entering its respective data in the latter half portion of its data entry stroke, each key comprising a key stem arranged in at least one aligned row, said apparatus including fixed guide means disposed in a plane intersecting the stroke path of said keys and supporting each of said key stems for movement relative thereto during each data entry stroke, interlock mechanism comprising endless flexible means threaded through the key stem for each of said keys and supported between adjacent keys by said guide means, said endless means being adapted to flex at the point of its engagement with a key stem when said engaged key stem is operated through a data entry stroke, said endless means being detached from said guide means and having an overall length sufficient to permit flexing thereof only to the degree required by one of said keys when operated to effect a data entry stroke, and said data keys cooperating with power-driven means to complete the input of data by said apparatus and said endless means including an inelastic cord-like member threaded through said key stems and a coupling device yieldably joining the ends of said cord-like member, said coupling device including switch means operated when said coupling device is tensioned by the flexure of said endless member upon operation of one of said keys to activate said power-driven means.

10. In a keyboard apparatus of the character described having a plurality of data keys arranged in side by side relationship in a plurality of rows, each manually operable through a data entry stroke of uniform extent and effective for entering its respective data in the latter half portion of its data entry stroke, each key comprising a key stem arranged in at least one aligned row, said apparatus including guide means disposed in a plane intersecting the stroke path of said keys and supporting each of said key stems for movement relative thereto during each data entry stroke, interlock mechanism comprising a flexible cord-like member threaded through an opening in the key stems for each of said keys and supported between adjacent keys by said guide means, said member comprising an endless loop having a plurality of runs, each one of which runs extends in operative relationship with an associated one of said plurality of said rows of said keys, said guide means including fixed coplanar portions disposed intermediate said keys, said openings in the respective key stems being disposed below the plane of said guide means when said keys are in their normal inactive position, said member under non-operative conditions disposed in a substantially sinuous configuration having a plurality of similar V-shaped sectors extending through each key stem and between the fixed portions of said guide means disposed intermediate said key stems, whereby said member is partially flexed at its point of engagement with the opening in each of said key stems, said flexible member being adapted for additional flexing at the point of its engagement with the key stem when said engaged key is operated through a data entry stroke, said member having an overall length sufficient to permit additional flexing thereof only to the extent required by one of said keys when operated to effect a data entry stroke.

11. The invention according to claim 10 including keyboard lockup means threaded by said flexible member in the same manner as said key stems and operative to additionally flex said member to a degree excluding additional flexure thereof by any one of said data keys to thereby effectively retain all said data keys in their normal inactivated position.

12. The invention according to claim 10 wherein said flexible member is inelastic and wherein a coupling device yieldably joins the ends of said member, said device being adjustable to provide a predetermined extent of yield between the ends of said member to thereby determine the extent of a data entry stroke by limiting the degree of additional flexure of said member when a data key is operated, said device yieldably tensioning said member to maintain said data keys in their normal inactivated position.

13. The invention according to claim 12 wherein said data keys cooperate with power-driven means to complete the input of data by said apparatus, and wherein said device includes switch means operated when said device is tensioned by the additional flexure of said member upon operation of one of said keys to activate said power-driven means.

14. An encoding keyboard for producing encoding signals representative of data to be entered into an associated data processing system comprising, a plurality of data indicative keys, each manually operable through a data entry stroke of uniform extent and including key stem means guided to enable movement of the respective key through a data entry stroke, an encoding member for each of said keys mounted for linear sliding motion to and from an effective encoding setting, electrical means responsive to the movement of an encoding member into an effective encoding setting for generating a combination of electrical signals unique to the respective encoding member, a power-driven member mounted to oscillate in a linear path of motion for positively driving an encoding member into said effective encoding setting, normally ineffective interposer means carried by each encoding member, and means for releasing said interposer means in response to operation of the respective data key for positively engaging with said power-driven member to cause an encoding member to be driven thereby into said effective encoding setting, said power-driven member comprising a flat grid element having a plurality of cutouts, means for slideably supporting said grid between said keys and said encoding members, and a cutout disposed adjacent each encoding member and including an edge for receiving the interposer means carried thereby, under conditions where the interposer means has been released.

15. The invention according to claim 14 wherein said releasing means comprise trigger means carried by each encoding member, said key stem means each include means for engaging said trigger means to release said interposer means, and a cutout disposed adjacent each key stem to permit said trigger engaging means to register therewith under conditions where the respective key is moved through a data entry stroke.

References Cited

UNITED STATES PATENTS

| | | | |
|---|---|---|---|
| 232,692 | 9/1880 | Da Costa | 197—107 |
| 2,408,754 | 10/1946 | Bush | 197—1 X |

(Other references on following page)

UNITED STATES PATENTS

| | | | |
|---|---|---|---|
| 2,891,649 | 6/1959 | Peterson | 197—14 |
| 2,909,092 | 9/1959 | Hildebrandt | 197—98 X |
| 2,978,086 | 4/1961 | Hickerson | 197—16 |
| 3,017,463 | 1/1962 | Dinsmore et al. | 197—98 X |
| 3,018,332 | 1/1962 | Johnson et al. | 197—1 X |
| 3,032,163 | 5/1962 | Flieg | 197—1 X |
| 3,104,388 | 9/1963 | Balenger | 197—98 X |
| 3,107,771 | 10/1963 | Debus | 197—107 |
| 3,189,153 | 6/1965 | Barnard et al. | 197—98 |
| 3,191,740 | 6/1965 | Smusz et al. | 197—16 |
| 3,233,715 | 2/1966 | Flieg | 197—16 X |
| 3,241,648 | 3/1966 | Stenudd | 197—1 |

OTHER REFERENCES

IBM Technical Disclosure Bulletin (two articles): (1) "Photo Keyboard," by J. J. Lynott, vol. 3, No. 11, April 1961, p. 44 only. (2) "Keyboard," by J. A. Taris, vol. 8, No. 8, January 1966, p. 1064 only.

ROBERT E. PULFREY, *Primary Examiner.*

E. S. BURR, *Examiner.*